March 13, 1928.

F. MENNILLO 1,662,532

PROCESS FOR COOKING AND CONDENSATING SEMILIQUID FOODS

Original Filed Jan. 30, 1925   2 Sheets-Sheet 1

INVENTOR.
Francesco Mennillo
BY
ATTORNEYS.

Patented Mar. 13, 1928.

1,662,532

UNITED STATES PATENT OFFICE.

FRANCESCO MENNILLO, OF WASHINGTON, DISTRICT OF COLUMBIA.

PROCESS FOR COOKING AND CONDENSATING SEMILIQUID FOODS.

Application filed January 30, 1925, Serial No. 5,859. Renewed January 19, 1928.

This invention relates to an apparatus and method for cooking and condensing semi-liquid food products such, for example, as purée for canned soup and the like.

One object of the invention is to produce a continuous process wherein the raw material continuously runs into the apparatus at what may be called one end thereof and comes out at the other end of the apparatus as a finished product, thus obviating the necessity of shutting off the process after each batch of material is cooked or condensed.

Another object of the invention is to cook the product uniformly throughout with no raw or scorched ingredients, thus producing a more palatable product.

Another object of the invention is to so pass the material through the apparatus that in all its course it will be enclosed and protected and will not have to be handled.

With these and other objects which will be apparent as the description proceeds, I will now describe my invention in connection with the accompanying drawings in which:—

Figure 1A:
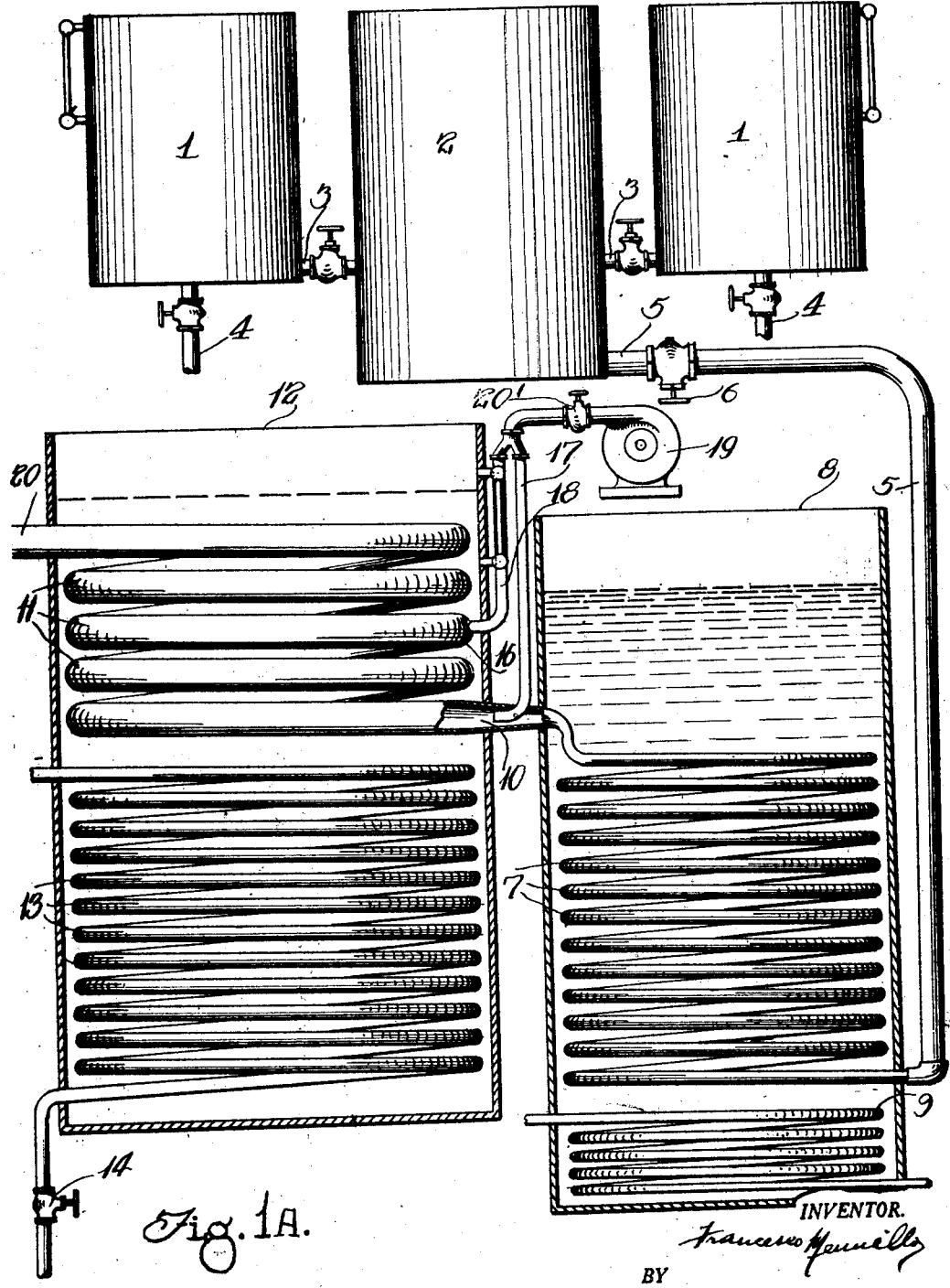
Figure 1B:
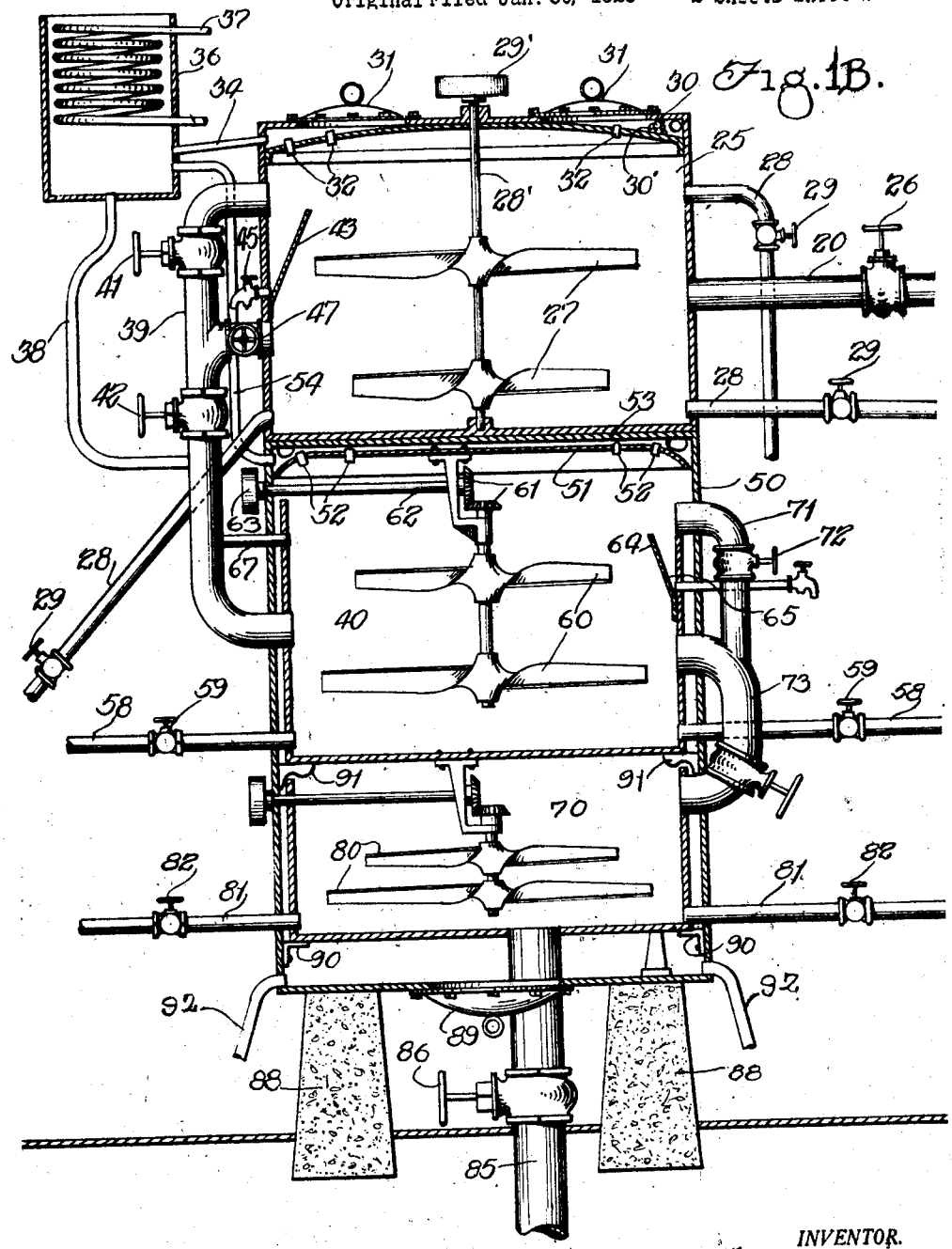

Figure 1$^A$ is a sectional view through the first portion of my apparatus; and, Fig. 1$^B$ is a sectional view through the finishing portions of the apparatus.

My apparatus is well adapted to condense various food products, but for convenience of description, I will take as an illustration the preparation of purée from raw tomatoes.

1—1 are tanks conventionally arranged on either side of a central tank 2 and connected thereto by valved tubes 3—3. The raw material or pulp is placed in the tanks 1—1 and these tanks may have valved tubes 4—4 leading from their bottoms for cleaning or other purposes.

Extending from the tank 2 is a tube 5 having therein a valve 6 to regulate the flow of the material from the tank 2 to a coil 7, preferably maintained in a vessel 8 partially filled with water. This water may be heated in any convenient manner as by a steam coil 9 near its bottom.

It will be understood that the tank 2 is situated sufficiently high above the coil 7 so that the weight of the material as it descends in the pipe 5 will force the material through the coil 7 and the rapidity with which it passes through the coil may be regulated by the valve 6, and after passing through the coil 7, the material enters an enlarged portion of the coil shown at 10 and from this portion circulates through a second coil 11 in a vessel 12. This vessel 12 may contain water and the coil 11 is further heated by a steam coil 13, the steam being controlled by a valve 14.

At the point 10 and conveniently at other points 16, air pipes 17—18 are tapped into the coil and dry air, preferably preheated, is forced through the pipes 17—18 by a pump 19, the current of air being controlled by a valve 20'. This dry and preferably preheated air may enter the coils under considerable pressure and pass through the materials therein to dry and condense the same. A pipe 20 leads from the coils 11, to a tank 25, the pipe 20 having therein a valve 26 to regulate the flow of the material and air therethrough. As the material passes through the pipe 20 into the tank 25, it is kept continually stirred by inclined blades 27 operated in any convenient way as through a spindle 28' and a pulley 29'. The material is kept in the tank 25 a considerable length of time and while therein, is treated with dry steam introduced through pipes 28 having therein controlling valves 29.

Preferably the tank 25 is lined with enamel to prevent the material from coming in contact with any metallic portion of the apparatus and is provided with a double top 30—30', the outer top 30 being provided with manholes and covers 31 for cleaning purposes. The top 30' has extending through it numerous short sections of pipe 32 projecting therethrough and extending a short distance above the top 30' into the space between the two tops 30 and 30', so that the steam and air as it rises in the tank 25 may collect between the tops 30 and 30' from whence it is led by pipe 34 to an open tank 36 in the upper portion of which a cold air coil 37 may be arranged. As the steam passing through the pipe 34 contacts with the cold water coil, the material carried over with the steam is condensed in tank 36 and runs back through a pipe 38 to a pipe 39 having its upper portion communicating with the tank 25 and its lower portion with a tank 40 situated below the tank 25. The pipe 39 is preferably provided with valves 41—42 to control the passage of the material through the pipe 39 and where the upper end of the pipe 39 connects with the tank 25, I preferably provide a baffle plate 43 inclined downwardly to the side of the tank 25 for the collection of any solid material, and just above the meeting place of the baffle plate 43 on the side of the tank, I provide a valved pipe 45 to draw off the solid material occasionally which may be returned to the tank 36 and this runs back through the pipe 38 into the system. I preferably provide a branch pipe 47 from the pipe 39 to communicate with the tank 25 at a lower point and this pipe may be also provided with a regulating valve as shown in the drawings.

The upper tank 25 may be conveniently supported by a chamber 50 having at its upper portion a cover 51 which like the cover 30' is provided with short sections of pipe 52 extending therethrough and communicating with a space between the top of the chamber 53 and the cover 51. A pipe 54 leads from this space between the top 53 and cover 51 into the tank 36 to conduct the steam collecting in the space between the cover 51 and top 53 into the tank 36. Within the chamber 50 is located the tank 40 and this tank is supplied with dry steam through pipes 58 having therein valves 59. The tank 40 is further provided with stirring blades 60 conveniently operated through gearing 61 and shaft 62 having at one end a pulley 63. The tank 40 may be provided with a baffle plate 64 and a valve 65 which functions like the baffle plate 43 and valve 45 in tank 25. I find it also convenient to extend a short pipe 67 from the pipe 39 into the top of the tank 40 and connect the tank 40 to a tank 70 located beneath it by a pipe 71 having a valve 72 therein. Material running through this pipe 71 is connected to a second pipe 73 which communicates with tank 40 and tank 70 as shown in 1ᴮ. I prefer to conduct the steam through the pipes 58 to enter the tank 40 and through pipes 28 to enter the tank 25 at different places so that the hot dry steam will not be introduced at one place in such quantities as to scorch the material in the tanks.

The tank 70 is similarly provided with stirring blades 80 and with steam pipes 81 having controlling valves 82 to introduce dry steam at different places into the tank 70 and the material after passing through the tanks as described is finally run out through a pipe 85 having a controlling valve 86 from the bottom of the tank 70.

I conveniently support the chamber 50 on supports 88 and in the bottom of the chamber I provide a manhole with a cover 89 for cleaning purposes, and support the tank 70 on lugs 90 conveniently fastened to the side of the chamber and the tank 40 may similarly be supported by lugs 91 above the tank 70. The chamber 50 may have doors through which the tanks may be inserted therein, the doors not being shown in the sectional view 1ᴮ. 92 are steam inlet pipes for cleaning the apparatus.

It will be observed that my apparatus has been constructed with a view of convenient assembly and convenience in getting at the parts for cleaning purposes whenever that is necessary, but since my process is a continuous one, it will rarely be necessary to disassemble the parts, the operation of the apparatus as a whole having in view the passage of the material therethrough in such a way that it will not be scorched or burned at any stage of the process, the material being continually changed in position and the cooking steam being regulated to gradually heat the material from its place of introduction and removed from the material after it has functioned to heat the same.

It will be noticed that the tank 70 is not so deep as the tank 40 and the steam rising from the same may pass up between the tank 40 and the walls of the chamber 50 and collect in the top of the chamber 50 from whence it is conducted through the pipe 54 to the tank 36, the food portion of which is condensed therein and runs back into the tank 40 through the pipes 38 and 39. The material is kept constantly stirred and agitated throughout its entire passage through the apparatus and runs out through the final pipe 85 completely and efficiently cooked and condensed and without burning or scorching and thus injuring its taste.

The operation of the device will be apparent from the foregoing, but to briefly set forth the operation, the material runs from the initial tanks 1 into the central tank 2, thence through the heating coils to the point where the dry heated air is forced into the coils, the air then assisting in carrying along the material and at the same time drying the same until it reaches the tank 25. Into this tank 25 the material is discharged and at the same time dry steam is introduced through a plurality of pipes 28 to further heat and cook the material, the steam passing out through the holes 32 into the space between the tubes 30 and 30' and is conducted by pipe 34 into the tank 36. The cooling coil 37 condenses the food products carried over by the steam and this product is returned to the tanks through the pipes 38 and 39 while the main portion of the material passes from the tank 25 through the pipe 39 into the tank 40 where it is further cooked and heated by the dry steam passing through the pipes 58 and the material passes from the tank 40 through the pipes 71 and 73 to the final tank 70 where the finishing cooking process takes place, the material in the tank 70 being heated by the dry steam passing through the pipes 81 and the material is finally withdrawn through the pipe 85 ready for use or for storing.

It is to be understood that the material before it is placed in tanks 1—1 has been freed of practically all its solid matter. In the case of tomato purée the solid matter is removed by a machine which forms no part of my invention and one great advantage of my process over the ordinary canning process is that I concentrate the purée practically free of solid matter. An average one pound can of tomatoes packed in the ordinary way should have about twenty-eight ounces of solids and four ounces of liquid. To make the tomato edible or to make soup from the ordinary canned tomatoes, the material must be boiled down to a certain concentration in the home kitchen which generally reduces the tomato mass to about two-thirds of its original weight and will make soup for five or six people after about one quart or more of water and the desired flavoring ingredients such as olive oil or butter and spices are added but during the home cooking of this tomato mass there is a great loss of food and flavor as it rises and carries with it some sugar and other flavoring ingredients. My process concentrates the tomato product while retaining all the sugar of the tomatoes, the coloring matter and the ingredients giving it its taste and fragrance and when canned and used, it is only necessary to add water, a little oil and spices and without cooking the same it makes a finished soup. After my heating process begins, I admit enough steam to keep the material a little above the boiling point 212° F. thereby preventing the accumulation of any fermentation germs, and my purée may be canned at this temperature and without the formation of germs, the material being in a concentrated form and in a condition where only water and the necessary flavoring ingredients need be added when used.

What I claim is:

1. That step in the process of cooking semi-liquid material which consists in forcing it through a coil and simultaneously heating the coil and introducing into the coil of material hot air to dry the material and assist in forcing it through the coil.

2. That step in the process of cooking semi-liquid material which consists in forcing it through a coil by its own weight and simultaneously heating the coil and introducing into the coil of material hot air to dry the material and assist in forcing it through the coil.

3. The process of cooking semi-solid material which consists in forcing the material through a coil, simultaneously heating the same, introducing dry air into the coil and forcing the material with the air into a tank, removing the air and vapors from the tank and simultaneously heating the material in the tank.

4. The process of cooking semi-solid material which consists in passing it through a tube, simultaneously heating the same, delivering the material into a tank, conducting vapors from the material and cooling the same to precipitate the solid matter carried over by the vapors in a semi-solid condition and conducting the semi-solid material back into the tank and simultaneously agitating the material in the tank.

5. The process of cooking semi-solid material which consists in heating the same in a pipe to raise it to a suitable temperature and discharging it continuously into a larger vessel and continuously stirring the mixture in the vessel, introducing dry steam at different points in the container to prevent scorching and continuously removing the cooked portions of the material.

6. The process of cooking semi-solid material which consists in forcing material through a coil, heating the same as it passes through the coil and delivering it finally into a vessel, continuously stirring the material after it reaches the vessel and continuously withdrawing the material from the vessel.

In testimony whereof I hereunto affix my signature.

FRANCESCO MENNILLO.